United States Patent
Kang et al.

(10) Patent No.: US 11,104,785 B2
(45) Date of Patent: Aug. 31, 2021

(54) THERMOPLASTIC RESIN COMPOSITION

(71) Applicant: LG CHEM, LTD., Seoul (KR)

(72) Inventors: Byoung Il Kang, Daejeon (KR); Eun Jung Choi, Daejeon (KR)

(73) Assignee: LG Chem, Ltd., Seoul (KR)

( * ) Notice: Subject to any disclaimer, the term of this patent is extended or adjusted under 35 U.S.C. 154(b) by 8 days.

(21) Appl. No.: 16/626,247

(22) PCT Filed: Mar. 19, 2019

(86) PCT No.: PCT/KR2019/003201
§ 371 (c)(1),
(2) Date: Dec. 23, 2019

(87) PCT Pub. No.: WO2019/182334
PCT Pub. Date: Sep. 26, 2019

(65) Prior Publication Data
US 2020/0216653 A1    Jul. 9, 2020

(30) Foreign Application Priority Data

Mar. 20, 2018 (KR) .................. 10-2018-0032286
Mar. 18, 2019 (KR) .................. 10-2019-0030765

(51) Int. Cl.
*C08L 25/12* (2006.01)
*C08L 33/10* (2006.01)
*C08L 55/02* (2006.01)

(52) U.S. Cl.
CPC .............. *C08L 25/12* (2013.01); *C08L 33/10* (2013.01); *C08L 55/02* (2013.01)

(58) Field of Classification Search
CPC .......... C08L 25/12; C08L 55/02; C08L 33/10; C08F 279/04; C08F 236/12
See application file for complete search history.

(56) References Cited

U.S. PATENT DOCUMENTS

| | | | |
|---|---|---|---|
| 5,229,457 A | 7/1993 | Kamoshita et al. | |
| 2009/0269531 A1 | 10/2009 | Arnould et al. | |
| 2010/0048798 A1 | 2/2010 | You et al. | |
| 2014/0186612 A1 | 7/2014 | Kwon et al. | |
| 2014/0296397 A1 | 10/2014 | Choi et al. | |
| 2014/0322487 A1* | 10/2014 | Choi ................. C08L 55/02 428/141 |
| 2017/0183455 A1 | 6/2017 | Yoo et al. | |
| 2017/0292017 A1 | 10/2017 | Jung et al. | |
| 2017/0327688 A1* | 11/2017 | Kim ................. C08L 33/04 |

FOREIGN PATENT DOCUMENTS

| | | |
|---|---|---|
| JP | H09143340 A | 6/1997 |
| JP | 3090942 B2 | 9/2000 |
| KR | 100645260 B1 | 11/2006 |
| KR | 10-2008-0112842 A | 12/2008 |
| KR | 20100022160 A | 3/2010 |
| KR | 20120021631 A * | 3/2012 |
| KR | 20120021631 A | 3/2012 |
| KR | 10-2014-0087879 A | 7/2014 |
| KR | 20160032668 A | 3/2016 |
| KR | 20160061877 A | 6/2016 |
| KR | 20160067675 A | 6/2016 |
| KR | 20170062888 A | 6/2017 |
| WO | WO2017178075 A1 | 10/2017 |

OTHER PUBLICATIONS

Polymer Handbook, Fourth edition (Year: 1999).*
Search Report dated Mar. 16, 2020 for European Application No. 19771730.9.
Korean Office Action for KR 10-2019-0030765; dated Aug. 21, 2020; 4 pages.
Search Report dated Jun. 24, 2019 for PCT Application No. PCT/KR2019/003201.

* cited by examiner

*Primary Examiner* — Mark S Kaucher
(74) *Attorney, Agent, or Firm* — Morgan, Lewis & Bockius LLP

(57) ABSTRACT

Provided is a thermoplastic resin composition that includes: a first copolymer including an unit derived from an aromatic vinyl-based monomer and an unit derived from a vinyl cyan-based monomer; a second copolymer having a refractive index of 1.51 to 1.53 and including an unit derived from an alkyl (meth)acrylate-based monomer, an unit derived from an aromatic vinyl-based monomer, and an unit derived from a vinyl cyan-based monomer; and a third copolymer including a conjugated diene-based polymer with an average particle diameter of 0.05 to 0.15 μm, an unit derived from an aromatic vinyl-based monomer, and an unit derived from a vinyl cyan-based monomer, and can be used for producing a molded article capable of realizing selective transmittance.

10 Claims, No Drawings

THERMOPLASTIC RESIN COMPOSITION

CROSS-REFERENCE TO RELATED APPLICATIONS

This application claims priority to and the benefit of Korean Patent Application No. 10-2018-0032286, filed on Mar. 20, 2018, and Korean Patent Application No. 10-2019-0030765, filed on Mar. 18, 2019, the disclosures of which are incorporated herein by reference in their entirety.

TECHNICAL FIELD

The present invention relates to a thermoplastic resin composition, and more particularly, to a thermoplastic resin composition capable of realizing selective transmittance.

BACKGROUND ART

A transparent thermoplastic resin composition includes: a matrix copolymer including an unit derived from an alkyl (meth)acrylate-based monomer, an unit derived from an aromatic vinyl-based monomer, and an unit derived from a vinyl cyan-based monomer; and a graft copolymer including a conjugated diene-based polymer, an unit derived from an alkyl (meth)acrylate-based monomer, an unit derived from an aromatic vinyl-based monomer, and an unit derived from a vinyl cyan-based monomer, wherein the refractive indices of the matrix copolymer and the graft copolymer have been adjusted to a range of 1.515 to 1.516 to ensure transparency. Characteristically, a molded article made of such a transparent thermoplastic resin composition is always transparent at room temperature.

The latest trends in home appliances demand diversity and specificity in appearance. For example, an instrument panel is required to have visibility (selective transmittance), that is, a material property of appearing opaque in ordinary circumstances but displaying clear text when a power unit is turned on.

However, until now, the development of a thermoplastic resin composition capable of realizing selective transmittance has not been completely accomplished.

DISCLOSURE

Technical Problem

The present invention is directed to providing a thermoplastic resin composition capable of realizing selective transmittance.

Technical Solution

One aspect of the present invention provides a thermoplastic resin composition that includes: a first copolymer including an unit derived from an aromatic vinyl-based monomer and an unit derived from a vinyl cyan-based monomer; a second copolymer having a refractive index of 1.51 to 1.53 and including an unit derived from an alkyl (meth)acrylate-based monomer, an unit derived from an aromatic vinyl-based monomer, and an unit derived from a vinyl cyan-based monomer; and a third copolymer including a conjugated diene-based polymer with an average particle diameter of 0.05 to 0.15 µm, an unit derived from an aromatic vinyl-based monomer, and an unit derived from a vinyl cyan-based monomer.

Another aspect of the present invention provides a thermoplastic resin molded article that includes: a first copolymer including an unit derived from an aromatic vinyl-based monomer and an unit derived from a vinyl cyan-based monomer; a second copolymer having a refractive index of 1.51 to 1.53 and including an unit derived from an alkyl (meth)acrylate-based monomer, an unit derived from an aromatic vinyl-based monomer, and an unit derived from a vinyl cyan-based monomer; and a third copolymer including a conjugated diene-based polymer with an average particle diameter of 0.05 to 0.15 µm, an unit derived from an aromatic vinyl-based monomer, and an unit derived from a vinyl cyan-based monomer, wherein the refractive index of a matrix part including the first and second copolymers and the refractive index of an impact modifying part including the third copolymer differ by 0.01 to 0.04.

Advantageous Effects

When a molded article is produced using a thermoplastic resin composition of the present invention, selective transmittance can be realized. Moreover, a thermoplastic resin composition of the present invention has excellent processability, excellent color characteristics, and excellent durability.

BEST MODE

Hereinafter, the present invention will be described in more detail to facilitate understanding of the present invention.

Terms and words used in this specification and claims should not be interpreted as being limited to commonly used meanings or meanings in dictionaries, and, based on the principle that the inventors can appropriately define concepts of terms in order to describe their invention in the best way, the terms and words should be interpreted with meanings and concepts which are consistent with the technological spirit of the present invention.

In the present invention, the refractive index refers to the absolute refractive index of a material and is recognized as the ratio of the speed of electromagnetic radiation in free space to the speed of the radiation in the material, wherein the radiation is the visible light having a wavelength of 450 nm to 680 nm. The refractive index can be measured using a known method, that is, generally by using an Abbe refractometer.

In the present invention, the average particle diameter of a conjugated diene-based polymer may be measured by a dynamic light scattering method, specifically, by using a Nicomp 380 instrument (manufactured by PSS Nicomp).

The average particle diameter described herein may refer to an arithmetic average particle diameter in the particle size distribution, i.e., an average particle diameter in the scattering intensity distribution, which is measured by the dynamic light scattering method.

In the present invention, a weight-average molecular weight may be measured as a relative value with respect to standard polystyrene (PS), by gel permeation chromatography (GPC; Waters Breeze) using tetrahydrofuran (THF) as an elution solvent.

1. Thermoplastic Resin Composition

The thermoplastic resin composition of one embodiment of the present invention includes: 1) a first copolymer including an unit derived from an aromatic vinyl-based monomer and an unit derived from a vinyl cyan-based monomer; 2) a second copolymer having a refractive index of 1.51 to 1.53 and including an unit derived from an alkyl (meth)acrylate-based monomer, an unit derived from an aromatic vinyl-based monomer, and an unit derived from a vinyl cyan-based monomer; and 3) a third copolymer including a conjugated diene-based polymer with an average particle diameter of 0.05 to 0.15 µm, an unit derived from an aromatic vinyl-based monomer, and an unit derived from a vinyl cyan-based monomer.

Generally, a thermoplastic resin molded article made of a thermoplastic resin composition including the first copolymer and the third copolymer appears opaque due to the difference in refractive index of the copolymers. However, the inventors have found that when the second copolymer having a specific composition and refractive index is further included in the thermoplastic resin composition, the second and third copolymers may work synergistically to impart the ability to realize selective transmittance to a molded article made of the thermoplastic resin composition. In other words, a thermoplastic resin molded article appearing opaque in ordinary circumstances (i.e., when no separate light source is provided) but clearly displaying text, light, and the like embedded therein when a separate light source is provided can be produced. The inventors have completed the present invention based on this finding.

The first and second copolymers may function as matrix resins, and the third copolymer may function as an impact modifier.

According to an embodiment of the present invention, the thermoplastic resin composition may further include 4) one or more additives selected from the group consisting of UV stabilizers and antioxidants.

Hereinafter, each component of the thermoplastic resin composition according to an embodiment of the present invention will be described in detail.

1) First Copolymer

The first copolymer includes the unit derived from the aromatic vinyl-based monomer and the unit derived from the vinyl cyan-based monomer.

The first copolymer may be used to balance the material properties, i.e., mechanical properties, processability, and heat resistance, of the thermoplastic resin composition.

In addition, the first copolymer may impart selective transmittance to a molded article made of the thermoplastic resin composition. That is, when no light source is provided, the molded article may appear opaque such that the text and the like embedded in the molded article are not displayed.

The first copolymer may have a refractive index of 1.55 to 1.57, 1.56 to 1.57, or 1.565 to 1.57, with the range of 1.565 to 1.57 being preferred.

When the above-described range is satisfied, the refractive index becomes similar to the refractive index of the conjugated diene-based polymer of the third copolymer, so that the selective transmittance can be easily realized. Moreover, the refractive indices of components of the thermoplastic resin composition of the present invention can be more easily balanced.

The unit derived from the aromatic vinyl-based monomer may be one or more selected from the group consisting of the unit derived from styrene, α-methylstyrene, α-ethylstyrene, and p-methylstyrene, with the unit derived from styrene being preferred.

The unit derived from the vinyl cyan-based monomer may be one or more selected from the group consisting of the unit derived from acrylonitrile, methacrylonitrile, phenyl acrylonitrile, and α-chloroacrylonitrile, with the unit derived from acrylonitrile being preferred.

The first copolymer may include the unit derived from the aromatic vinyl-based monomer at 75 to 85 wt % or 75 to 80 wt % based on the total weight of the first copolymer, with the range of 75 to 80 wt % being preferred. The first copolymer may include the unit derived from the vinyl cyan-based monomer at 15 to 25 wt % or 20 to 25 wt % based on the total weight of the first copolymer, with the range of 20 to 25 wt % being preferred. When these ranges are satisfied, the material properties, i.e., mechanical properties, processability, and heat resistance, of the thermoplastic resin composition can be more easily balanced.

The first copolymer may have a weight-average molecular weight of 90,000 to 180,000 g/mol or 100,000 to 150,000 g/mol, with the range of 100,000 to 150,000 g/mol being preferred. When the above-described range is satisfied, the material properties, i.e., mechanical properties, processability, and heat resistance, of the thermoplastic resin composition can be more easily balanced.

The first copolymer may be prepared by polymerizing an aromatic vinyl-based monomer and a vinyl cyan-based monomer by one or more methods selected from the group consisting of bulk polymerization, emulsion polymerization, and suspension polymerization, with bulk polymerization being preferred.

In the case of bulk polymerization, since additives such as emulsifiers or suspending agents are not added, a high-purity copolymer containing a minimum amount of impurities can be prepared. Therefore, it may be advantageous for a thermoplastic resin composition for realizing selective transmittance to include a copolymer prepared by bulk polymerization.

As the first copolymer, a commercially available material may be used.

The first copolymer may be included at 50 to 70 wt % or 55 to 70 wt % based on the total weight of the thermoplastic resin composition, with the range of 55 to 70 wt % being preferred. When the above-described range is satisfied, the material properties, i.e., mechanical properties, processability, and heat resistance, of the thermoplastic resin composition can be more easily balanced, and at the same time, the desired material properties can be easily ensured.

2) Second Copolymer

The second copolymer includes the unit derived from the alkyl (meth)acrylate-based monomer, the unit derived from the aromatic vinyl-based monomer, and the unit derived from the vinyl cyan-based monomer, and has a refractive index of 1.51 to 1.53.

The second copolymer may impart excellent stiffness, excellent scratch resistance, and an excellent coloring property to the thermoplastic resin composition. In addition, the second copolymer may work synergistically with the third copolymer to impart selective transmittance to a molded article made of the thermoplastic resin composition. In other words, when a light source is provided, the molded article may transmit light such that the text, light, and the like embedded in the molded article are clearly displayed.

The second copolymer may have a refractive index of 1.51 to 1.53, 1.515 to 1.53, 1.515 to 1.525, or 1.515 to 1.52, with the range of 1.515 to 1.52 being preferred. When the above-described range is satisfied, the selective transmittance of a molded article made of the thermoplastic resin composition can be easily controlled. When the above-described range is not satisfied, it may be difficult to attain the desired level of selective transmittance in a molded article made of the thermoplastic resin composition.

The unit derived from the alkyl (meth)acrylate-based monomer may be one or more selected from the group consisting of the unit derived from methyl (meth)acrylate, ethyl (meth)acrylate, propyl (meth)acrylate, 2-ethylhexyl (meth)acrylate, decyl (meth)acrylate, and lauryl (meth)acrylate, with the unit derived from methyl methacrylate being preferred.

The unit derived from the alkyl (meth)acrylate-based monomer may be included at 65 to 80 wt % or 70 to 75 wt % based on the total weight of the second copolymer, with the range of 70 to 75 wt % being preferred. When the above-described range is satisfied, the selective transmittance, stiffness, and scratch resistance of the second copolymer can be improved.

The types of unit derived from the aromatic vinyl-based monomer have been described in the description of the first copolymer.

The unit derived from the aromatic vinyl-based monomer may be included at 3 to 15 wt % or 5 to 10 wt % based on the total weight of the second copolymer, with the range of 5 to 10 wt % being preferred. When the above-described range is satisfied, the stiffness and processability of the second copolymer can be improved.

The types of unit derived from the vinyl cyan-based monomer have been described in the description of the first copolymer.

The unit derived from the vinyl cyan-based monomer may be included at 10 to 25 wt % or 15 to 20 wt % based on the total weight of the second copolymer, with the range of 15 to 20 wt % being preferred. When the above-described range is satisfied, the chemical resistance, stiffness, and mechanical properties of the second copolymer can be improved.

The second copolymer may have a weight-average molecular weight of 50,000 to 150,000 g/mol or 70,000 to 130,000 g/mol, with the range of 70,000 to 130,000 g/mol being preferred. When the above-described range is satisfied, the material properties of the second copolymer can be easily balanced.

The second copolymer may be prepared by polymerizing the alkyl (meth)acrylate-based monomer, the aromatic vinyl-based monomer, and the vinyl cyan-based monomer by one or more methods selected from the group consisting of bulk polymerization, emulsion polymerization, and suspension polymerization, with bulk polymerization being preferred.

In the case of bulk polymerization, since additives such as emulsifiers or suspending agents are not added, a high-purity copolymer containing a minimum amount of impurities can be prepared. Therefore, it may be advantageous for a thermoplastic resin composition for realizing selective transmittance to include a copolymer prepared by bulk polymerization.

As the second copolymer, a commercially available material may be used.

The second copolymer may be included at 5 to 30 wt % or 5 to 15 wt % based on the total weight of the thermoplastic resin composition, with the range of 5 to 15 wt % being preferred. When the above-described range is satisfied, the stiffness, scratch resistance, and selective transmittance of the thermoplastic resin composition can be improved, and the transparency exhibited when a light source is provided can be more easily maintained.

3) Third Copolymer

The third copolymer includes the conjugated diene-based polymer with an average particle diameter of 0.05 to 0.15 μm, the unit derived from the aromatic vinyl-based monomer, and the unit derived from the vinyl cyan-based monomer.

The third copolymer may not only impart excellent processability and excellent surface gloss characteristics to the thermoplastic resin composition but may also function as an impact modifier within a thermoplastic resin molded article.

In addition, the third copolymer may work synergistically with the second copolymer to impart selective transmittance to a molded article made of the thermoplastic resin composition; in other words, when a light source is provided to the molded article, the molded article may transmit light such that the text, light, and the like embedded in the molded article are clearly displayed.

The third copolymer may have a refractive index of 1.51 to 1.53, 1.515 to 1.53, 1.515 to 1.525, or 1.515 to 1.52, with the range of 1.515 to 1.52 being preferred. When the above-described range is satisfied, the refractive indices of the first to third copolymers can be more easily balanced, and a thermoplastic resin molded article exhibiting selective transmittance can be produced.

As the conjugated diene-based polymer, a modified conjugated diene-based polymer prepared by the polymerization of conjugated diene-based monomers and the modification of the obtained conjugated diene-based polymer by graft polymerization with the aromatic vinyl-based monomer and the vinyl cyan-based monomer may be used.

The conjugated diene-based monomer may be one or more selected from the group consisting of 1,3-butadiene, isoprene, chloroprene, and piperylene, with 1,3-butadiene being preferred.

The conjugated diene-based polymer may have an average particle diameter of 0.05 to 0.15 μm, preferably, 0.07 to 0.13 μm. Below the above-described range, the mechanical properties of the thermoplastic resin composition may be significantly degraded, and above the above-described range, the light may be refracted at the interface of the conjugated diene-based polymer, and thus the thermoplastic resin composition may not realize selective transmittance.

The conjugated diene-based polymer may be included at 45 to 60 wt % or 50 to 55 wt % based on the total weight of the third copolymer, with the range of 50 to 55 wt % being preferred. When the above-described range is satisfied, the chemical resistance, stiffness, mechanical properties, processability, and surface gloss of the third copolymer can be improved.

The types of the unit derived from the aromatic vinyl-based monomer have been described in the description of the first copolymer.

The unit derived from the aromatic vinyl-based monomer may be included at 30 to 45 wt % or 35 to 40 wt % based on the total weight of the third copolymer, with the range of 35 to 40 wt % being preferred. When the above-described range is satisfied, the chemical resistance, stiffness, mechanical properties, processability, and surface gloss of the thermoplastic resin composition can be improved.

The types of the unit derived from the vinyl cyan-based monomer have been described in the description of the first copolymer.

The unit derived from the vinyl cyan-based monomer may be included at 5 to 20 wt % or 10 to 15 wt % based on the total weight of the third copolymer, with the range of 10 to 15 wt % being preferred. When the above-described range is satisfied, the chemical resistance, stiffness, mechanical properties, processability, and surface gloss of the thermoplastic resin composition can be improved.

The third copolymer may be prepared by polymerizing conjugated diene-based monomers by one or more methods selected from the group consisting of bulk polymerization, emulsion polymerization, and suspension polymerization to prepare a conjugated diene-based polymer, and then polymerizing an aromatic vinyl-based monomer and a vinyl cyan-based monomer by one or more methods selected from the group consisting of bulk polymerization, emulsion polymerization, and suspension polymerization in the presence of the obtained conjugated diene-based polymer. Among these, the conjugated diene-based polymer and the third copolymer are preferably prepared by emulsion polymerization.

When emulsion polymerization is used to prepare a conjugated diene-based polymer, it may be easy to prepare a conjugated diene-based polymer having the above-described average particle diameter. When the emulsion polymerization of an aromatic vinyl-based monomer and a vinyl cyan-based monomer is performed in the presence of the above conjugated diene-based polymer to prepare a third copolymer, a graft copolymer with improved surface gloss characteristics and improved mechanical properties can be prepared.

As the third copolymer, a commercially available material may be used.

The third copolymer may be included at 15 to 35 wt % or 20 to 30 wt % based on the total weight of the thermoplastic resin composition, with the range of 20 to 30 wt % being preferred. When the above-described range is satisfied, selective transmittance can be imparted to the thermoplastic resin composition.

4) Additives

As the additive, one or more additives selected from the group consisting of UV stabilizers and antioxidants may be used.

The additive may be included at 0.2 to 1.1 parts by weight or 0.6 to 0.9 part by weight based on 100 parts by weight of the thermoplastic resin composition, that is, based on 100 parts by weight of the sum of the first to third copolymers, with the range of 0.3 to 0.9 part by weight being preferred. When the above-described range is satisfied, the denaturation and decomposition of the thermoplastic resin composition can be prevented.

The UV stabilizer may prevent the thermoplastic resin composition from undergoing the denaturation caused by environmentally-induced UV and radicals.

The antioxidant may prevent the thermoplastic resin composition from undergoing heat discoloration or the like while being processed. Moreover, the antioxidant may prevent the thermoplastic resin composition from undergoing the decomposition caused by environmentally-induced radical formation.

The UV stabilizer may be an amine-based compound, wherein the amine-based compound may be one or more selected from the group consisting of 2-(2'-hydroxy-5'-tert-octylphenyl)benzotriazole, bis(2,2,6,6-tetramethyl-4-piperidyl)sebacate, 2-(2H-benzotriazol-2-yl)-4,6-bis(1-methyl-1-phenylethyl)phenol, and 2-(2H-benzotriazol-2-yl)-p-cresol. Among these, one or more selected from the group consisting of 2-(2'-hydroxy-5'-tert-octylphenyl)benzotriazole and bis(2,2,6,6-tetramethyl-4-piperidyl)sebacate are preferred.

The UV stabilizer may be included at 0.2 to 0.5 part by weight or 0.3 to 0.4 part by weight based on 100 parts by weight of the thermoplastic resin composition, that is, based on 100 parts by weight of the sum of the first to third copolymers, with the range of 0.3 to 0.4 part by weight being preferred. When the above-described range is satisfied, excellent weather resistance can be ensured.

The antioxidant may be one or more selected from the group consisting of octadecyl 3-(3,5-di-tert-butyl-4-hydroxyphenyl)propionate and 3,9-bis(octadecyloxy)-2,4,8,10-tetraoxa-3,9-diphosphaspiro [5.5]undecane.

The antioxidant may be included at 0.2 to 0.6 part by weight or 0.3 to 0.5 part by weight based on 100 parts by weight of the sum of the first, second, and third copolymers, with the range of 0.3 to 0.5 part by weight being preferred. When the above-described range is satisfied, color characteristics and selective transmittance can be improved.

2. Thermoplastic Resin Molded Article

According to another embodiment of the present invention, there is provided a thermoplastic resin molded article that includes: a first copolymer including an unit derived from an aromatic vinyl-based monomer and an unit derived from a vinyl cyan-based monomer; a second copolymer having a refractive index of 1.51 to 1.53 and including an unit derived from an alkyl (meth)acrylate-based monomer, an unit derived from an aromatic vinyl-based monomer, and an unit derived from a vinyl cyan-based monomer; and a third copolymer including a conjugated diene-based polymer with an average particle diameter of 0.05 to 0.15 µm, an unit derived from an aromatic vinyl-based monomer, and an unit derived from a vinyl cyan-based monomer, wherein the refractive index of a matrix part including the first and second copolymers and the refractive index of an impact modifying part including the third copolymer differ by 0.01 to 0.04.

The thermoplastic resin molded article may be produced by extruding and injection-molding the thermoplastic resin composition including the first to third copolymers. Description of the thermoplastic resin composition has been provided above.

It is preferable that the refractive indices of the matrix part and the impact modifying part differ by 0.015 to 0.03.

When the refractive indices of the matrix part and the impact modifying part satisfy the above-described range, selective transmittance can be realized. Specifically, when a light source is provided to a thermoplastic resin molded article, the light can be transmitted through the molded article, so that the text, light, and the like embedded in the molded article are clearly displayed, and when no light source is provided, the molded article may appear opaque and not display the text and the like embedded therein. However, when the difference in refractive index is below the above-described range, the molded article may always be transparent in ordinary circumstances, that is, even when no light source is provided, and when the difference in refractive index is above the above-described range, the molded article may always be opaque even when a light source is provided.

The matrix part is the part formed by extruding and injection-molding the first and second copolymers, and has a refractive index of 1.53 to 1.55 or 1.53 to 1.54, with the range of 1.53 to 1.54 being preferred. When the above-described range is satisfied, the molded article may realize selective transmittance.

The impact modifying part is the part formed by extruding and injection-molding the third copolymer, and may refer to the conjugated diene-based polymer of the third copolymer. The impact modifying part may have a refractive index of 1.51 to 1.52 or 1.51 to 1.515, with the range of 1.51 to 1.515 being preferred. When the above-described range is satisfied, the molded article may realize selective transmittance.

The thermoplastic resin molded article may have an illuminance of 85 lux or more and a transmittance of 10% or less, and preferably has an illuminance of 90 lux or more and a transmittance of 8% or less. When these ranges are satisfied, a thermoplastic resin molded article exhibiting excellent selective transmittance can be provided.

The illuminance may be obtained by projecting an LED source light onto a 3-mm-thick thermoplastic resin molded article specimen from directly behind and refer to the illuminance of the source light transmitted therethrough, and it may be measured using an illuminance measuring instrument (CL-500A, manufactured by Konica Minolta, Inc.). The transmittance is defined as the percentage of the light passing through the specimen with respect to the beam initially projected and may be measured using haze-gard plus (manufactured by BYK-Gardner GmbH).

Meanwhile, the thermoplastic resin molded article may have a yellow index, the "b" value obtained with a CIE colorimeter, of 1.1 or less, preferably 0.8 or less. When the above-described conditions are satisfied, a thermoplastic resin molded article having excellent color characteristics can be produced.

In addition, the thermoplastic resin molded article may have a color change over time (ΔE) of 0.1 or less. When the above-described range is satisfied, a thermoplastic resin molded article having excellent weather resistance can be produced.

The color change over time may be determined by exposing a specimen to a fluorescent UV lamp (340 nm) using UV2000 (manufactured by ATLAS (USA)), measuring the color change after 100 hours of exposure, and substituting the measurement into the following equation to calculate ΔE.

$$\Delta E = \sqrt{(L'-L_0)^2 + (a'-a_0)^2 + (b'-b_0)^2}$$

In the above equation, L', a', and b' are respectively the L, a, and b values measured with the CIE LAB color coordinate system after exposing a specimen to a fluorescent UV lamp (340 nm) for 100 hours using UV2000 (manufactured by ATLAS (USA)), and $L_0$, $a_0$, and $b_0$ are respectively the L, a, b values of the specimen measured with the CIE LAB color coordinate system before exposure to the fluorescent UV lamp (340 nm) using UV2000 (manufactured by ATLAS (USA)).

MODE FOR INVENTION

Hereinafter, the present invention will be described in detail with reference to embodiments so that those skilled in the art can easily carry out the present invention. However, the present invention may be realized in several different forms, and therefore, is not limited to embodiments described herein.

Examples and Comparative Examples

The details of the components used in the following Examples and Comparative Examples are as follows.

(A) SAN copolymer: 81HF (refractive index: 1.57, composition: styrene units at 77 wt % and acrylonitrile units at 23 wt %) manufactured by LG Chem. was used.

(B) MSAN copolymer (B-1): XT500 (refractive index: 1.52, composition: methyl methacrylate units at 72 wt %, styrene units at 9 wt %, and acrylonitrile units at 19 wt %, weight-average molecular weight: 80,000 g/mol) manufactured by LG Chem. was used.

(B-2) Blendex 866 (refractive index: 1.59, composition: methyl methacrylate units at 5 wt %, styrene units at 70 wt %, and acrylonitrile units at 25 wt %, weight-average molecular weight: 3,000,000 g/mol) manufactured by Crompton Corporation was used.

(C) Graft copolymer (C-1): DP229M (refractive index: 1.52, graft copolymer obtained by graft copolymerizing styrene at 36 wt % and acrylonitrile at 14 wt % with a butadiene rubber polymer having an average particle diameter of 0.1 μm at 50 wt %) manufactured by LG Chem. was used.

(C-2): DP270M (refractive index: 1.52, graft copolymer obtained by graft copolymerizing styrene at 30 wt % and acrylonitrile at 10 wt % with a butadiene rubber polymer having an average particle diameter of 0.3 μm at 60 wt %) manufactured by LG Chem. was used.

(C-3): SA180 (refractive index: 1.52, graft copolymer obtained by graft copolymerizing styrene and acrylonitrile with a butadiene rubber polymer having an average particle diameter of 0.1 μm and a butadiene rubber polymer having an average particle diameter of 0.3 μm, weight ratio of the butadiene rubber polymer having an average particle diameter of 0.1 μm to the butadiene rubber polymer having an average particle diameter of 0.3 μm=3:7) manufactured by LG Chem. was used.

(D) UV stabilizer (D-1): Tinuvin® 329 manufactured by BASF AG was used.

(D-2): Tinuvin® 770 manufactured by BASF AG was used.

(E) Antioxidant (E-1): IR1076 manufactured by Ciba Inc. was used.

(E-2): PEP-8 manufactured by ADEKA Corporation was used.

The components (A) to (E) were mixed in the amounts shown in [Table 1] and [Table 2] below and stirred to prepare thermoplastic resin compositions.

Experimental Example 1

Each of the thermoplastic resin compositions according to the examples and comparative examples was fed into a twin-screw extruder set at 230° C. and extruded to prepare pellets. The pellets were measured for material properties by the methods described below, and the results are shown in [Table 1] and [Table 2] below.

① Melt Flow index (g/10 min): measured in accordance with ASTM D1238 using F-B01 (manufactured by Toyo Seiki Seisaku-sho, Ltd.) at 220° C. and 10 kg.

Experimental Example 2

The pellets prepared in Experimental Example 1 were injection-molded at 220° C. to prepare specimens. The specimens prepared as such were measured for material properties by the methods described below, and the results are shown in [Table 1] and [Table 2] below.

① Refractive index: The refractive indices of the matrix part and the impact modifying part of a specimen were measured using an Abbe refractometer.

② Color change over time (ΔE): A specimen was exposed to a fluorescent UV lamp (340 nm) using UV2000 (manufactured by ATLAS (USA)), the color change after 100 hours of exposure was measured, and the measurement was substituted into the following equation to calculate ΔE.

$$\Delta E = \sqrt{(L'-L_0)^2 + (a'-a_0)^2 + (b'-b_0)^2}$$

In the above equation, L', a', and b' are respectively the L, a, and b values measured with the CIE LAB color coordinate system after exposing a specimen to a fluorescent UV lamp (340 nm) for 100 hours using UV2000 (manufactured by ATLAS (USA)), and $L_0$, $a_0$, and $b_0$ are respectively the L, a, b values of the specimen measured with the CIE LAB color coordinate system before exposure to the fluorescent UV lamp (340 nm) using UV2000 (manufactured by ATLAS (USA)).

③ Color: The "b" value was determined using a CIE colorimeter.

④ Illuminance (lux): LED source light was projected onto a 3-mm-thick specimen from directly behind, and the illuminance of the source light transmitted therethrough was measured using an illuminance measuring instrument (CL-500A, manufactured by Konica Minolta, Inc.)

⑤ Clarity: LED source light was projected onto a 3-mm-thick specimen from directly behind, and the color and shape of the text transmitted therethrough were evaluated with the naked eye.

○: Clear, Δ: Average, x: Cloudy

Referring to Table 1 and Table 2, Examples 1 to 5, which include all of the first to third copolymers, have a melt flow index of 41 g/10 min or more, a color change over time of 0.1 or less, a "b" value of 1.1 or less, an illuminance of 93 lux or more, and excellent clarity. From this result, it can be predicted that it will be possible to produce a molded article capable of realizing selective transmittance and having excellent processability, excellent color characteristics, and excellent durability using a thermoplastic resin composition of the present invention. On the other hand, Comparative Example 1, which does not include a second copolymer, has low illuminance, low clarity, and a high "b" value. From this result, it can be predicted that Comparative Example 1 will always be opaque and have low color characteristics.

Like Comparative Example 1, Comparative Example 2, which does not include a second copolymer but further includes an ABS graft copolymer with a large average particle diameter, has low illuminance and low clarity. From

TABLE 1

| Classification | | | Examples | | | | |
| --- | --- | --- | --- | --- | --- | --- | --- |
| | | | 1 | 2 | 3 | 4 | 5 |
| (A) SAN copolymer (parts by weight) | | | 70 | 75 | 65 | 55 | 70 |
| (B) MSAN copolymer (parts by weight) | (B-1) | | 10 | 5 | 10 | 15 | 10 |
| | (B-2) | | — | — | — | — | — |
| (C) Graft copolymer (parts by weight) | (C-1) | | 20 | 20 | 25 | 30 | 20 |
| | (C-2) | | — | — | — | — | — |
| | (C-3) | | — | — | — | — | — |
| (D) UV stabilizer (parts by weight) | (D-1) | | 0.15 | 0.15 | 0.15 | 0.15 | 0.15 |
| | (D-2) | | 0.15 | 0.15 | 0.15 | 0.15 | 0.15 |
| (E) Antioxidant (parts by weight) | (E-1) | | 0.2 | 0.2 | 0.2 | 0.2 | 0.25 |
| | (E-2) | | 0.2 | 0.2 | 0.2 | 0.2 | 0.25 |
| Melt Flow index | | | 50 | 50 | 42 | 41 | 51 |
| Refractive index of matrix part | | | 1.534 | 1.537 | 1.532 | 1.530 | 1.534 |
| Refractive index of impact modifying part | | | 1.513 | 1.513 | 1.513 | 1.513 | 1.513 |
| Color change over time | | | 0.1 | 0.1 | 0.1 | 0.1 | 0.1 |
| Color ("b" value) | | | 0.8 | 0.8 | 1.0 | 1.0 | 1.1 |
| Illuminance (lux) | | | 101 | 95 | 93 | 105 | 96 |
| Clarity | | | ○ | ○ | ○ | ○ | ○ |

TABLE 2

| Classification | | | Comparative Examples | | | | | | |
| --- | --- | --- | --- | --- | --- | --- | --- | --- | --- |
| | | | 1 | 2 | 3 | 4 | 5 | 6 | 7 |
| (A) SAN copolymer (parts by weight) | | | 80 | 80 | 80 | 70 | 70 | 70 | 70 |
| (B) MSAN copolymer (parts by weight) | (B-1) | | — | — | 20 | 10 | 10 | — | — |
| | (B-2) | | | | | | | 10 | 10 |
| (C) Graft copolymer (parts by weight) | (C-1) | | 20 | 5 | — | — | — | 20 | — |
| | (C-2) | | — | 15 | — | 20 | — | — | 20 |
| | (C-3) | | — | — | — | — | 20 | — | — |
| (D) UV stabilizer (parts by weight) | (D-1) | | 0.15 | 0.15 | 0.15 | 0.15 | 0.15 | 0.15 | 0.15 |
| | (D-2) | | 0.15 | 0.15 | 0.15 | 0.15 | 0.15 | 0.15 | 0.15 |
| (E) Antioxidant (parts by weight) | (E-1) | | 0.2 | 0.2 | 0.2 | 0.2 | 0.25 | 0.2 | 0.2 |
| | (E-2) | | 0.2 | 0.2 | 0.2 | 0.2 | 0.25 | 0.2 | 0.2 |
| Melt Flow index | | | 50 | 52 | 80 | 55 | 45 | 8 | 10 |
| Refractive index of matrix part | | | 1.568 | 1.568 | 1.534 | 1.534 | 1.534 | 1.574 | 1.574 |
| Refractive index of impact modifying part | | | 1.513 | 1.513 | 1.513 | 1.513 | 1.513 | 1.513 | 1.513 |
| Color change over time | | | 0.05 | 0.08 | 0.9 | 0.07 | 0.08 | 0.1 | 0.1 |
| Color ("b" value) | | | 1.3 | 0.4 | 2.0 | 0.4 | 1.1 | 0.8 | 0.8 |
| Illuminance (lux) | | | 80 | 78 | 120 | 78 | 76 | 28 | 26 |
| Clarity | | | x | x | ○ | x | x | x | x | this result, it can be predicted that Comparative Example 2 will always be opaque. However, due to including two types of ABS graft copolymers with different average particle diameters, Comparative Example 2 exhibits excellent color characteristics.

Comparative Example 3, which does not include a third copolymer, has an excessively high illuminance and excellent clarity. From this result, it can be predicted that Comparative Example 3 will always be transparent. In addition, from the large color change over time and high "b" value, it can be predicted that Comparative Example 3 will exhibit low basic properties.

Comparative Example 4, which includes an ABS graft copolymer with a large average particle diameter instead of a third copolymer, has low illuminance and low clarity. From this result, it can be predicted that Comparative Example 4 will always be opaque.

Comparative Example 5, which includes a bimodal ABS graft copolymer instead of a third copolymer, has low illuminance and low clarity. From this result, it can be predicted that Comparative Example 5 will always be opaque.

Comparative Examples 6 and 7, which include an MSAN copolymer with a high refractive index instead of a second copolymer, have a very low melt flow index, low illuminance, and low clarity. From this result, it can be predicted that Comparative Examples 6 and 7 will have significantly low processability and always be opaque.

The invention claimed is:

1. A thermoplastic resin composition comprising:
    a first copolymer having a refractive index of 1.55 to 1.57 and including an unit derived from an aromatic vinyl-based monomer and an unit derived from a vinyl cyan-based monomer;
    a second copolymer having a refractive index of 1.51 to 1.53 and including an unit derived from an alkyl (meth)acrylate-based monomer, an unit derived from an aromatic vinyl-based monomer, and an unit derived from a vinyl cyan-based monomer; and
    a third copolymer having a refractive index of 1.51 to 1.53 and including a conjugated diene-based polymer with an average particle diameter of 0.05 to 0.15 µm, an unit derived from an aromatic vinyl-based monomer, and an unit derived from a vinyl cyan-based monomer.

2. The thermoplastic resin composition of claim 1, wherein the thermoplastic resin composition includes:
    the first copolymer at 50 to 70 wt %;
    the second copolymer at 5 to 30 wt %; and
    the third copolymer at 15 to 35 wt %.

3. The thermoplastic resin composition of claim 1, wherein the second copolymer includes:
    the unit derived from the alkyl (meth)acrylate-based monomer at 65 to 80 wt %;
    the unit derived from the aromatic vinyl-based monomer at 3 to 15 wt %; and
    the unit derived from the vinyl cyan-based monomer at 10 to 25 wt %.

4. The thermoplastic resin composition of claim 1, wherein the second copolymer has a weight-average molecular weight of 50,000 to 150,000 g/mol.

5. The thermoplastic resin composition of claim 1, wherein the third copolymer includes:
    the conjugated diene-based polymer;
    the unit derived from the aromatic vinyl-based monomer at 30 to 45 wt %; and
    the unit derived from the vinyl cyan-based monomer at 5 to 20 wt %.

6. The thermoplastic resin composition of claim 1, further comprising one or more additives selected from the group consisting of a UV stabilizer and an antioxidant.

7. The thermoplastic resin composition of claim 6, wherein the additive is included at 0.2 to 1.1 parts by weight based on 100 parts by weight of the sum of the first copolymer, the second copolymer, and the third copolymer.

8. A thermoplastic resin molded article comprising:
    a first copolymer having a refractive index of 1.55 to 1.57 and including an unit derived from an aromatic vinyl-based monomer and an unit derived from a vinyl cyan-based monomer;
    a second copolymer having a refractive index of 1.51 to 1.53 and including an unit derived from an alkyl (meth)acrylate-based monomer, an unit derived from an aromatic vinyl-based monomer, and an unit derived from a vinyl cyan-based monomer; and
    a third copolymer having a refractive index of 1.51 to 1.53 and including a conjugated diene-based polymer with an average particle diameter of 0.05 to 0.15 µm, an unit derived from an aromatic vinyl-based monomer, and an unit derived from a vinyl cyan-based monomer,
    wherein a refractive index of a matrix part including the first copolymer and the second copolymer and a refractive index of an impact modifying part including the third copolymer differ by 0.01 to 0.04.

9. The thermoplastic resin molded article of claim 8, wherein the matrix part has a refractive index of 1.53 to 1.55.

10. The thermoplastic resin molded article of claim 8, wherein the impact modifying part has a refractive index of 1.51 to 1.52.

* * * * *